United States Patent [19]

Haase et al.

[11] Patent Number: 5,684,358
[45] Date of Patent: Nov. 4, 1997

[54] LUMINESCENT SCREEN

[75] Inventors: Markus Haase; Helmut Bechtel; Wolfram Czarnojan; Dieter Wädow, all of Aachen, Germany

[73] Assignee: U.S. Philips Corporation, New York, N.Y.

[21] Appl. No.: 562,140

[22] Filed: Nov. 22, 1995

[30]    Foreign Application Priority Data

Nov. 30, 1994 [DE]    Germany ............... 44 42 599.6

[51] Int. Cl.$^6$ ..................................... H01J 29/20
[52] U.S. Cl. ............. 313/466; 313/467; 313/495; 313/486
[58] Field of Search ........................ 313/466, 467, 313/495, 496, 497, 485, 486

[56]    References Cited

U.S. PATENT DOCUMENTS 3,461,077  8/1969  Kobayashi et al. ............ 252/301.36
3,690,929  9/1972  Yokota et al. .................. 317/100 B

*Primary Examiner*—Nimeshkumar Patel
*Attorney, Agent, or Firm*—John C. Fox; Norman N. Spain

[57]    ABSTRACT

The invention relates to a display screen comprising a phosphor composition of a sulphide and/or selenide-containing phosphor which is provided with a coating which is composed of germanium disulphide and/or germanium diselenide. In such a display screen, in particular a low-energy cathode ray display screen, the advantages of the efficient sulphide or selenide-containing phosphors can be used and said display screen remains bright and rich in contrast for a long period of time because the coating, which is composed of germanium disulphide and/or germanium diselenide, surprisingly acts as a stabilizing protective coating which limits the corrosion processes in sulphide and/or selenide-containing phosphors induced by low-energy radiation.

15 Claims, 1 Drawing Sheet

LUMINESCENT SCREEN

BACKGROUND OF THE INVENTION

The invention relates to a display screen, especially a flat-panel display screen such as a low-energy cathode ray display screen, which comprises a phosphor composition of a sulphide or selenide-containing phosphor which is provided with a coating.

The trend towards flat-panel display screens has led to low-energy cathode ray display screens which constitute a new development in the field of luminescent-display devices. Flat-panel display screens were developed for three market segments, i.e. office automation, audio/video technology and navigation and entertainment. In the field of office automation reference must be made, in particular, to mobile applications which range from the Notebook Computer, Personal Digital Assistant, fax machine to the mobile telephone. In the field of audio/video, the flat-panel display screens are intended not only for use in camcorders but also in television receivers and monitors. The third field of application comprises flat-panel display screens which are to be used as monitors for navigation systems in cars and aircraft, but also as display screens for electronic games.

In the case of flat-panel display screens, geometric and other aspects have led to a reduction of the maximum accelerating voltage to values which are much lower than in customary cathode ray display screens. As, on the other hand, the picture brightness and energy efficiency of the display screen decreases as the accelerating voltage decreases, said accelerating voltage must not be reduced too much. Low-energy cathode ray display screens are therefore operated at accelerating voltages in the range from approximately 1 to 10 kV. Said accelerating voltages are clearly below those of customary cathode ray display screens, which are operated at a voltage of typically 25–35 kV; however, they are clearly above the accelerating voltage of vacuum fluorescent display screens, which are operated at approximately 0.01 to 0.3 kV.

Phosphors for cathode ray display screens, also when they are of the conventional type, are customarily subjected to a surface treatment so that they can more adequately meet the requirements.

One of the requirements to be met is that the phosphor compositions should be readily dispersable in dispersion solutions used in the photolithographic manufacturing processes for display screens. For this purpose, surface coatings are developed which yield free-flowing powders from which stable dispersions can be made in a simple manner.

A further aspect in the development of coatings is the protection against aggressive chemicals used, for example, in the photolithographic manufacture of display screens. Particularly in the customarily used "flow coating" process in which dichromates are applied, unprotected phosphors are subject to chemical attack. At the same time, dichromate is also consumed, which causes the viscosity of the dispersions to change.

To overcome this problem and to improve the photosensitive properties and the stability of phosphor dispersions used for photolithographic processes, it is proposed in U.S. Pat. No. 3,690,929 to add slightly soluble, acid oxides to these dispersions, said acid oxides being the oxides of at least one element of the group formed by boron, vanadium, gallium, germanium, arsenic, niobium, molybdenum, antimony, tantalum and tungsten. It is alternatively possible to precipitate these oxides on the phosphor. The oxide of germanium can be manufactured by decomposing the sulphide.

Further requirements to be met by phosphors relate to the colour quality. This is the reason why in the so-called "pigmented" phosphors the coating of dispersing aids is replaced by or combined with a second type of coating whose main constituents are colour particles. Said colour particles reduce the reflection of ambient light from the phosphor grains and hence increase the contrast of the image depicted on the display screen. In the case of phosphors whose chromatic values deviate from the standard, said colour particles may additionally serve as colour filters which bring the chromatic values in conformity with said standard.

Functionally different coatings are used in the case of phosphors for vacuum fluorescent display screens in which excitation takes place by means of low-energy electrons of several tens of volts to maximally several hundred volts. In this case, charging effects during excitation of the phosphors, which adversely affect the excitation efficiency, must be precluded. Coatings for phosphor powders for vacuum fluorescent display screens are therefore composed of conductivity-improving materials such as indium tin oxide, free metal powders and such.

However, phosphors used for low-energy cathode ray display screens must meet entirely new requirements. In order to achieve a good picture brightness in spite of the low exciting voltage, these display screens must be operated at high currents. To ensure that the necessary current does not increase to impracticably high values, use must simultaneously be made of phosphors having a high efficiency. Even if the architecture of the display screen permits extremely high current values, the low efficiency of a phosphor cannot be compensated for at will by increasing the current value because, after increasing linearly with the current intensity, the luminous intensity of the phosphor finally attains a saturation value. The current intensity at which this saturation value is attained depends upon the type of phosphor used and on how it must be prepared.

Therefore, it is very important for low-energy cathode ray display screens hat the phosphors used exhibit a high efficiency and that they reach said saturation value only at high current intensities. The condition of a high efficiency at a sufficiently high saturation value is fulfilled by only very few phosphors, in particular by sulphide and selenide-containing phosphors such as ZnS:Ag, ZnS:Cu, ZnCdSe:Ag, ZnS:Mn, activated Zn(S,Se), activated $Y_2O_2S$ and such.

However, under the excitation conditions in low-energy cathode ray display screens, said sulphide and/or selenide-containing phosphors are very rapidly degraded, i.e. the bombardment with low-energy electrons leads to an accelerated reduction of the luminous intensity and efficiency of the phosphor. Probably the low penetration depth of the low-energy electrons causes the radiation-induced reactions to be concentrated and intensified in the surface layers of the phosphor grains.

In conventionally coated display screens, which are excited by a low-energy cathode ray tube, a rapid reduction in brightness is observed. In coloured display screens, in which customarily three different phosphors are used, this additionally leads to a slow change of the chromatic values of all mixed colours when each one of the phosphors used does not degrade at an equal rate.

However, commercial low-energy cathode ray display screens, for example colour television receivers having a flat display screen should produce images having a constant brightness and pure chromatic values for several thousand hours of operation.

SUMMARY OF THE INVENTION

It is an object of the invention to provide a display screen comprising a phosphor composition of a sulphide and/or selenide-containing phosphor with a coating, which composition does not degrade when it is excited by electrons of approximately 1 to 10 kV.

This object is achieved in accordance with the invention by a display screen comprising a phosphor composition of a sulphide and/or selenide-containing phosphor which is provided with a coating which comprises germanium disulphide and/or germanium diselenide.

In such display screens, the advantages of the "efficient" sulphide-containing phosphors can be used and said display screens remain bright and rich in contrast for a long period of time.

It has surprisingly been found that a coating which comprises germanium disulphide and/or germanium diselenide acts as a stabilizing protective coating which limits the corrosion processes in sulphide and/or selenide-containing phosphors induced by low-energy radiation.

Germanium disulphide is colourless, it does not react with the sulphidic or selenide-containing substrates and is not degraded by radiation. Since it is colourless, it does not influence the chromatic values of the phosphors. It is hydrophillic, so that the coated particles can be easily dispersed. Germanium diselenide has essentially the same properties as germanium disulphide. However, it is not colourless and, dependent upon the quantity of selenide, acts as a filter for green and blue radiation.

A preferred embodiment of the invention is characterized in that the coating additionally comprises germanium dioxide. A quantity of the vitreous-amorphous germanium dioxide strengthens the germanium disulphide or germanium diselenide coating.

It may be preferred that the phosphor is composed of activated zinc sulphide, cadmium sulphide or zinc-cadmium-sulphide mixed crystals, and that the coating is composed of germanium disulphide and, optionally, germanium dioxide.

It may further be preferred that the phosphor is composed of activated mixed crystals of zinc sulphide selenide $ZnS_{1-x}Se_x$ or cadmium sulphide selenide $CdS_{1-x}Se_x$, wherein $0<x<0.2$, and that the coating is composed of a mixture of germanium disulphide and germanium diselenide in the ratio of 1-x/x and, optionally, of germanium dioxide.

Within the scope of the invention, it may also be preferred that the phosphor coated in accordance with the invention has a covering layer of a powder aid.

The inventive coating per se is abrasion-resistant, so that the coated phosphor as such can be transported and used. Customarily, however, phosphor powders are provided with a covering layer of a powder aid for ease of handling. It has been found that powder aids which comprise surface-bonded hydroxyl groups, such as $SiO_2$, further promote ageing of the phosphors, thus, it is particularly advantageous to protect a sulphide or selenide-containing phosphor, having a covering layer of a powder aid such as $SiO_2$, by a stabilizing intermediate layer of germanium disulphide or germanium diselenide.

For the same reason, combining a sulphide and/or selenide-containing phosphor having a stabilizing coating of germanium disulphide and/or germanium diselenide with a covering layer which comprises pigments, particularly those having surface-bonded hydroxyl groups, is particularly preferred.

To manufacture a coating for a sulphide and/or selenide-containing phosphor, which coating is essentially composed of germanium disulphide and/or germanium diselenide, in a first step, a solution of a germanium compound in an acid/water mixture with an acid concentration of $4 \leq n \leq 8$ is prepared and, in a second step, germanium disulphide and/or germanium selenide is/are precipitated on the phosphor by reacting the germanium-containing solution with the sulphide and/or selenide-containing phosphor.

These and other aspects of the invention will be apparent from and elucidated with reference to the embodiments described hereinafter.

The sulphide and/or selenide-containing phosphors, which are provided with a stabilizing coating in accordance with the invention, are in the first place sulphide-containing zinc phosphors such as ZnS:Ag, ZnS:Cu, ZnS:Mn and such. In accordance with the invention, it is further possible to stabilize phosphors on the basis of cadmium sulphide and zinc cadmium sulphide. The life of oxysulphide phosphors, for example on the basis of $Y_2O_2S$, could also be improved. In addition, phosphors on the basis of $ZnS_{1-x}Se_x$ or $CdS_{1-x}Se_x$, wherein $0<x \leq 0.2$ can be readily stabilized with germanium sulphide/germanium selenide by means of the method in accordance with the invention.

These phosphor substrates can take the form of primary particles or of granulates mixed with pigment and binders. The grain size of the phosphor particles is not critical. The primary grain size of commercially available phosphors ranges approximately from 2 to 20 µm.

These substrate particles are covered with a thin and uniform layer of germanium disulphide and/or germanium diselenide. The layer thickness customarily ranges from 0.001 to 0.2 µm and, as it is so thin, penetration of electrons takes place without an appreciable loss of energy.

The coating may additionally comprise organic or inorganic binders, such as latex, methyl cellulose or aluminium phosphates and $SiO_2$, to further improve the density of the coating and to limit the possibility of chemical attacks on the substrate.

Germanium(IV) compounds are used as the starting compounds for the coating. Preferably, use is made of germanium dioxide and germanium tetrachloride.

For the manufacture of the coating solution, these germanium compounds are individually or jointly dissolved in diluted hydrochloric acid or diluted sulphuric acid. The concentration of the germanium compounds in the acid, aqueous solution may range from 0.5 to 20 wt. %.

The molarity of the hydrogen-ion concentration must range between 4 and 8. A very good deposition is obtained if an approximately 6-molar hydrogen-iron concentration is used.

The phosphor to be coated is dispersed in this solution. The reaction with the sulphide ions or selenide ions of the sulphide and/or selenide-containing phosphor, which sulphide and/or selenide ions are released at the surface of the acid solution, causes germanium disulphide and/or germanium diselenide to be deposited on the phosphor particles in a surface reaction. Thus, a compact covering layer of germanium disulphide and/or germanium diselenide is formed on the phosphor.

This suspension is stirred for 10 minutes to 2 hours to irreversibly age the freshly precipitated deposit.

Subsequently, the coated phosphor is separated from the excess of coating solution, whereafter it is washed with a washing liquid, for example alcohol, and dried.

Next, the coated phosphor can be subjected to an oxidizing post-treatment which causes the germanium disulphide and/or germanium diselenide precipitates to be partly converted to germanium dioxide.

To this end, the phosphor composition which has been pretreated as described hereinabove, is treated in an oxygen-containing atmosphere at a temperature of 315° C. to 500° C. for 10 minutes to 2 hours.

By virtue of said oxidative treatment, a mechanically and chemically very resistant coating of germanium disulphide and/or germanium diselenide comprising vitreous-amorphous germanium dioxide is obtained. The coating adheres firmly to the substrate.

After the actual coating process, a redensification step can be carried out in which the coated phosphor powder is heated to 200° C. for 10 to 60 minutes.

The coating thus produced has a thickness of approximately 10 nm. By means of ESCA measurements it can be determined that the coating completely covers the phosphor substrates, although it is not essential to the invention that the coating tightly encloses the substrate particles.

The coating is hydrophilic and compatible with the customary coatings, so that it can suitably be used as the base layer for further coatings which may be subsequently provided to improve the powder properties or chromatic values of the material.

Germanium disulphide and germanium dioxide do not exhibit competitive absorption. They are colourless and do not change the chromatic values of the phosphor.

The coating itself does not show any signs of degradation. All in all, the life of the material is increased by the coating, as has been established by ALT tests, by a factor of 5–10.

It is particularly advantageous if the coating additionally comprises $SiO_2$. This $SiO_2$ coating may be applied in the form of a mixture with the germanium-containing coating, or it can be separately provided as a covering layer.

To improve the contrast of the image reproduced on the display screen, it may be advantageous if the phosphor powder additionally comprises a pigment. Said pigment is admixed with the phosphor in the weight ratio of 0.5:100 to 3:100.

BRIEF DESCRIPTION OF THE DRAWING

The sole FIGURE of the drawing is a cross-section of a position of a display screen of the invention.

DETAILED DESCRIPTION OF THE INVENTION

Figure 1:
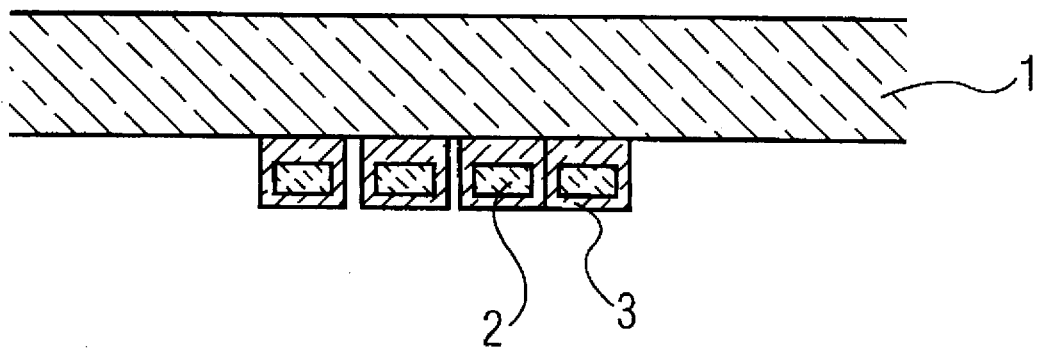

The invention will now be described in greater detail with reference to the following examples and to the FIGURE of the drawing.

Exemplary Embodiment 1

A quantity of 114 ml germanium tetrachloride are dissolved in a mixture of 5000 ml distilled water and 5000 ml 37.5% hydrochloric acid. A quantity of 500 g ZnS:Ag phosphor are added to this solution and stirred for 20 minutes. Subsequently, the coated phosphor is filtered off and dried at 120° C.

Exemplary Embodiment 2

A quantity of 104 g germanium dioxide are suspended in 1500 ml water, 1000 ml of a 1-molar sodium hydroxide solution are added and the whole is stirred for 5 minutes. Next, 2000 ml 37% hydrochloric acid and subsequently an overall quantity of 1000 ml water and 8000 ml 37% hydrochloric acid are alternately added in portions. A quantity of 5000 g ZnS:Cu are added to this solution and stirred for 20 minutes. Subsequently, the phosphor thus coated is filtered off and dried at 120° C.

The coating is oxidized by heating the dry sulphide-coated phosphor composition to a final temperature of 420° C. at a heating rate of 4° C./min.

Exemplary Embodiment 3

A quantity of 114 ml germanium tetrachloride are dissolved in a mixture of 5000 ml distilled water and 5000 ml 37.5% hydrochloric acid. A quantity of 500 g red-luminescing ZnCdS:Ag phosphor are added to this solution and stirred for 20 min. Subsequently, the coated phosphor is filtered off and dried at 120° C.

Exemplary Embodiment 4

A quantity of 20.8 g germanium dioxide are suspended in 300 ml water, 200 ml of a 1-molar sodium hydroxide solution are added and the whole is stirred for 5 min. Next, 400 ml 37% hydrochloric acid are added and subsequently an overall quantity of 2000 ml water and 1600 ml 37% hydrochloric acid are added in portions. A quantity of 1000 g $Y_2O_2S$:Eu are added to this solution and stirred for 20 minutes. Subsequently, the phosphor thus coated is filtered off and dried at 120° C.

The coating is oxidized by heating the dry sulphide-coated phosphor composition to a final temperature of 440° C. at a heating rate of 4° C./min.

Exemplary Embodiment 5

A quantity of 1000 g of the coated phosphor in accordance with exemplary embodiments 1 to 4 are stirred into 7.5 liters of a 1:1 mixture of water and acetone, and 20 ml of a colloidal silicic acid solution (Ludox® AS-40, Dupont, 40% in water, calculated as $SiO_2$) are added to the suspension. The pH-value of the suspension should be approximately 6 and, if necessary, can be readjusted with sulphuric acid. Subsequently, the suspension is stirred for 12 hours.

FIG. 1 shows a portion of the resultant display screen 1 provided with a phosphor powder 2 which powder is provided with a coating 3 according to the exemplary embodiment 1.

The suspension is then filtered, the phosphor is washed with a 1:1 mixture of water and acetone and subsequently dried.

Exemplary Embodiment 6

The phosphor composition in accordance with exemplary embodiments 1 to 5 is used to manufacture a flat-panel display screen for a colour display tube.

To this end, a thin light-sensitive layer which becomes sticky upon exposure is provided on the inside of the screen and dried. Subsequently, this layer is exposed through a shadow mask and the exposed, sticky, circular picture elements are toned with a phosphor powder in accordance with exemplary embodiment 1.

In a second and third exposure step, other areas of the light-sensitive layer are toned with the phosphor powders in accordance with exemplary embodiments 2 and 3. Subsequently, said light-sensitive layer is burned-out at a temperature >400° C.

A display screen having three phosphor powders in the colours red, blue and green, which are not provided with a stabilizing coating, is manufactured in the same manner and serves as a standard.

These display screens are subjected to an accelerated life test (ALT) as regards picture brightness and colour reproduction in relation to the radiant energy of 4 kV radiation launched into said display screens.

The efficiency I/Io of the display screen which serves as a standard decreases substantially in the beginning and finally remains constant at a level of 20% of the starting value, however, the picture brightness of the display screen comprising the phosphors in accordance with the invention decreases only little and remains constant at approximately 80% of the starting value.

We claim:

1. A display screen provided with a layer of a phosphor composition, said phosphor composition comprising at least one member of the group consisting of sulfide and selenide containing phosphors coated with a coating comprising at least one germanium compound of the group consisting of germanium disulphide and germanium diselenide.

2. A display screen comprising a phosphor composition as claimed in claim 1, characterized in that the coating additionally comprises up to 80 wt. % germanium dioxide.

3. A display screen as claimed in claim 2 wherein the phosphor is composed of activated zinc sulphide, cadmium sulphide or zinc-cadmium-sulphide mixed crystals, and the coating is composed of germanium disulphide and, optionally, germanium dioxide.

4. A display screen as claimed in claim 2 wherein the phosphor is composed of activated mixed crystals of zinc sulphide selenide $ZnS_{1-x}Se_x$ or cadmium sulphide selenide $CdS_{1-x}Se_x$, wherein $0<x<0.2$, and the coating is composed of a mixture of germanium disulphide and germanium diselenide in the ratio of 1-x/x and, optionally, germanium dioxide.

5. A display screen as claimed in claim 2 wherein a pigment is added to the phosphor.

6. A display screen as claimed in claim 2 wherein the phosphor composition comprises a covering layer of a powder aid.

7. A display screen comprising a phosphor composition as claimed in claim 1, characterized in that the phosphor is composed of activated zinc sulphide, cadmium sulphide or zinc-cadmium-sulphide mixed crystals, and the coating is composed of germanium disulphide and, optionally, germanium dioxide.

8. A display screen as claimed in claim 7 wherein a pigment is added to the phosphor.

9. A display screen as claimed in claim 7 wherein the phosphor composition comprises a covering layer of a powder aid.

10. A display screen comprising a phosphor composition as claimed in claim 1, characterized in that the phosphor is composed of activated mixed crystals of zinc sulphide selenide $ZnS_{1-x}Se_x$ or cadmium sulphide selenide $CdS_{1-x}Se_x$, wherein $0<x<0.2$, and the coating is composed of a mixture of germanium disulphide and germanium diselenide in the ratio of 1-x/x and, optionally, germanium dioxide.

11. A display screen as claimed in claim 10 wherein a pigment is added to the phosphor.

12. A display screen as claimed in claim 10 wherein the phosphor composition comprises a covering layer of a powder aid.

13. A display screen comprising a phosphor composition as claimed in claim 1, characterized in that a pigment is added to the phosphor.

14. A display screen as claimed in claim 13 wherein the phosphor composition comprises a covering layer of a powder aid.

15. A display screen comprising a phosphor composition as claimed in claim 1, characterized in that the phosphor composition comprises a covering layer of a powder aid.

* * * * *